(12) United States Patent
Hottinen et al.

(10) Patent No.: US 7,162,272 B1
(45) Date of Patent: Jan. 9, 2007

(54) TRANSMISSION ANTENNA DIVERSITY

(75) Inventors: Ari Hottinen, Espoo (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 1214 days.

(21) Appl. No.: 09/660,668

(22) Filed: Sep. 13, 2000

Related U.S. Application Data

(63) Continuation of application No. PCT/FI99/00334, filed on Apr. 23, 1999.

(30) Foreign Application Priority Data

| Apr. 24, 1998 | (FI) | ................................. 980915 |
| Jun. 12, 1998 | (FI) | ................................. 981377 |

(51) Int. Cl.
*H04M 1/00* (2006.01)

(52) U.S. Cl. ...................... 455/562.1; 455/101; 455/60

(58) Field of Classification Search ............. 455/562.1, 455/101, 69
See application file for complete search history.

(56) References Cited

U.S. PATENT DOCUMENTS

| 5,097,484 A | * | 3/1992 | Akaiwa ....................... 375/267 |
| 5,507,035 A | * | 4/1996 | Bantz et al. ................. 455/133 |
| 5,809,019 A | * | 9/1998 | Ichihara et al. ............. 370/334 |
| 6,175,747 B1 | * | 1/2001 | Tanishima et al. ........ 455/562.1 |
| 6,600,934 B1 | * | 7/2003 | Yun et al. ................. 455/562.1 |

FOREIGN PATENT DOCUMENTS

| EP | 0 582 323 | 2/1994 |
| EP | 0 741 465 | 11/1996 |
| JP | 2-200018 | 8/1990 |
| WO | 96/37969 | 11/1996 |

OTHER PUBLICATIONS

International Search Report for PCT/FI99/00334, Nov. 9, 1999.

* cited by examiner

*Primary Examiner*—Joseph Feild
*Assistant Examiner*—S. Smith
(74) *Attorney, Agent, or Firm*—Squire, Sanders & Dempsey L.L.P.

(57) ABSTRACT

In mobile communications systems transmission antenna diversity is used e.g. to compensate for fading caused to the signal on the radio path. It is known to make the choice of transmission antenna jointly for all subscriber connections, but it is not hereby possible to offer the optimum transmission antenna to simultaneous connections. The present invention aims at a method for implementing transmission antenna diversity on a data transmission connection, which is set up between a transmitting unit (BS), wherein there are several transmission antenna routes (ANT1, ANT2, ANT3), and a receiving unit (MS1, MS2). In the method, a broadcast signal is transmitted through all transmission antenna routes (ANT1, ANT2, ANT3) of the transmitting unit, with the aid of these signals a choice is made in the receiving unit (MS1, MS2) of the optimum transmission antenna route connected for use. According to the invention, the method is characterised in that the broadcast signal of each transmission antenna route is shaped by an individual signal shaping method which is different from the others and a transmission antenna route is connected for use based on the received antenna choice message, individually for each receiving unit.

39 Claims, 11 Drawing Sheets

TRANSMISSION ANTENNA DIVERSITY

This is a continuation of a U.S. national stage of application under 35 U.S.C. §371 of international stage application No. PCT/FI99/00334, filed on Apr. 23, 1999. Priority is claimed under 35 U.S.C. §119(a) and 35 U.S.C. §365(b) form Finnish Patent Application No. 980915, which was filed on Apr. 24, 1998, and Finnish Patent Application No. 981377, which was filed on Jun. 12, 1998, and from which priority was properly claimed in the aforementioned international stage application.

FIELD OF THE INVENTION

The invention concerns a method and an arrangement for arranging transmission antenna diversity in a mobile communication system.

BACKGROUND OF THE INVENTION

In radio systems implemented by CDMA (Code Division Multiple Access), the operation is based on scattered spectrum communication. The transmitted signal is scattered by an individual hash code $W_i$, e.g. a Walsh code, addressed to the subscriber, whereby the transmission is spread out on a broadband radio channel, which is e.g. 1,25; 6,4 or 20 MHz. Hereby it is possible on the same broadband radio channel to transmit simultaneously to several subscribers CDMA signals processed with different hash codes. In CDMA systems, the special hash code of each subscriber hereby produces a traffic channel in the system in the same sense as the time slot in a TDMA system. E.g. in an IS-95, the hash code means a code, by which the channels are distinguished from one another. All transmitted hash codes can also be multiplied by a scrambling code which is specific for the base transceiver station or the antenna. At the receiving end, the CDMA signal is broken up using the subscriber's hash code, whereby a narrow-band signal will result. The broadband signals of other subscribers represent noise in the receiver beside the desired signal. In this application reference is mostly made to a CDMA system in accordance with the IS-95 standard, although the invention is suitable for any system. In CDMA systems, the communication may be TDD-based (Time Division Duplex), whereby the uplink and downlink directions of the base station connections are set up at the same frequency in different time slots, or FDD-based (Frequency Division Duplex), whereby the frequencies of the uplink and downlink channels differ from each other by a duplex frequency.

It must be possible in all cellular systems to regulate at least the transmission power of the mobile station, so that its transmission will arrive at the base transceiver station with an adequate signal-to-noise ratio irrespectively of how far the mobile station is located from the base transceiver station. Power control is described in the following using a CDMA system as an example. FIG. 1 in the appended drawing shows a downlink CDMA traffic channel (Forward Traffic Channel), which includes the following code channels: a common channel, one synchronising channel, from one to seven calling channels and a maximum number of 61 traffic channels. The maximum is when there is only one calling channel besides the synchronizing channel. Each code channel is orthogonally spread and thus broadened by using a random noise sequence phase quadrature pair.

On the common channel a scattered spectrum signal is transmitted constantly at standard power, which signal is used for synchronising the MS mobile stations and for other broadcasting to the mobile stations.

The traffic is used for transfer of user and signalling information to the mobile station MS. Each downlink traffic channel contains a power control sub-channel, on which power control commands are transferred to the mobile station during the connection, in response to which the mobile station will change its transmission power.

The power control sub-channel is formed so that power control bits are contantly transmitted among the bits of the normal traffic channel. The bits are located in the frame so that from the completed traffic channel, which is a convolution coded and interleaved frame formed by modulation symbols, two successive modulation symbols are removed at regular intervals and they are replaced by power control bits. The procedure is generally known in the field and it is called symbol puncturing. The puncturing pattern shows which symbols are removed from the frame and replaced with power control bits.

FIG. 2 of the appended drawing shows signal transmission from the sender to the receiver in a telecommunications system. The information to be transmitted is conveyed over a transmission channel, such as a radio channel, modulated in a form suitable for the channel. Non-idealities of the transmission channel, such as signal reflections, noise and interference caused by other connections, will cause changes in the signal containing the information, so the signal perceived by the receiver is never an exact copy of the signal transmitted by the sender. By using channel coding the information transmitted in digital systems can be made to tolerate better any non-idealities of the transmission path. At the receiving end, the receiver corrects the received signal in a channel corrector based on a channel estimate, that is, with the aid of the channel characteristics known to itself, and it undoes the modulation and channel coding used on the transmission channel.

The mobile station MS is usually connected to a base station providing the best signal quality. For the duration of a handover during the call the mobile station may in CDMA systems be simultaneously connected to several base stations BS, until some base station signal turns out to be better than the others, whereby the call is continued through this base station BS. A handover of this kind is called soft handover.

In a mobile communications system environment, the reliable transmission is disturbed by signal fading on the radio path. To compensate for fading, various means have been developed in mobile communications systems, such as reception diversity and power control as well as some solutions based on diversity use of the transmission antenna. The published patent application EP-741 465 presents one such transmission diversity solution for implementation at the base station. In the publication, the mobile station chooses the best signal out of several transmission antenna signals and notifies the base station of this choice, whereupon the base station continues the transmission through this chosen antenna. The base station adds a first packet identifier to the first data packet and transmits the first data packet together with its identifier through one antenna. Correspondingly, the base station adds the second packet identifier to the second data packet and sends the second data packet to packet together with its identifier through another antenna. The mobile station receives both these transmissions and compares the received signal levels with one another. Having chosen the optimum transmission branch, the mobile station notifies the base station of the chosen packet identifier in a control time slot. The base station sends the transmission intended for the concerned mobile station by way of the indicated antenna. According to the publication, the signals of several signal connections are combined in the coding stage before the transmission is directed to different transmission branches, so when using the antenna diversity according to the publication, all user data is sent through the same chosen transmission antenna branch. The method according to the publication is suitable for use also when the transmission and reception frequencies are different, that is, when frequency-division duplexing FDD is used.

It is a problem with known transmission antenna diversity methods and with the solution of the EP publication described above that the choice of antenna is centralised jointly for all subscriber connections, whereby all traffic is directed for transmission by way of one antenna. Thus, the solution of the EP publication is not suitable for setting up several simultaneous subscriber connections by way of different antennas. It is another problem that the antenna chosen by a mobile station may be misinterpreted at the base station, when the choice notification is based on information of one bit or a few bits in the individual message. Due to data transmission errors, this information may be erroneous in the reception. If the base station misinterprets the antenna chosen by the mobile station and then transmits by way of the misinterpreted antenna, the data transmission quality will suffer from the base station to the mobile station, as the mobile station assumes that the transmission comes from the antenna it has chosen. The waiting value of the false interpretation in the information may hereby be up to 0.5. If the choice antenna is misinterpreted at the base station, then e.g. the interpretation of power control bits may fail in the downlink direction. A further problem with the EP publication described above is that channels set up through different antennas are not orthogonal in relation to one another, whereby they will cause interference to each other.

BRIEF SUMMARY OF THE INVENTION

The purpose of this invention is an individual choice of transmission diversity antenna for each receiving unit and to ensure the quality of data transmission through a reliable transmission antenna diversity.

These objectives are achieved through methods according to the invention, which are characterised in that which is said in the independent claims 1, 27, 28, 43 and 44. Advantageous embodiments of the invention are presented in the dependent claims.

The invention also aims at an arrangement for implementing transmission antenna diversity characterised in that which is said in the independent claims 55, 59 and 60.

The invention is based on the idea that the receiving unit chooses an optimum transmission antenna route for the transmitting unit, such as a transmission antenna branch or a transmission antenna beam, based on information produced for the broadcasting transmitted by the transmitting unit through each transmission antenna route or for the traffic channel transmission, and it announces its choice to the transmitting unit, which will connect the transmission to one transmission antenna route based on this received notification, independently of other subscriber connections.

In a preferred embodiment of the invention, the information is produced for the broadcasting in such a way that the broadcasting of the transmission antenna route of each transmitting unit is shaped in such a signal shaping manner individual for each antenna route, which identifies the antenna routes. Such individual signal shaping methods are e.g. an antenna route specific hash code, a hash code in parallel once or several times, a symbol pattern, a frequency offset or channel coding.

In another embodiment of the invention, the information for the broadcasting is produced in such a way that on the traffic channel of each transmission antenna route an individual emission is transmitted, which identifies the transmission antenna route. It is advantageous that the transmitting unit transmits user data through a transmission antenna route in accordance with a message which it receives hereafter, so that the receiving unit is able to verify the antenna route to be used for the transmission. In time division systems it is also possible that the individual emission is the same on all branches, but their transmission time slot is different. Hereby the combination of transmission time slot and identifier will determine the transmission antenna route.

It is an advantage of this kind of transmission antenna diversity that the quality of the data transmission will improve owing to the choice of an individual transmission antenna route. In addition, it is an advantage of the transmission antenna diversity according to the invention that it is possible therein independently to connect simultaneous subscriber connections through some transmission antenna route chosen in accordance with the invention, independently of the transmission antenna routes of other subscriber connections.

One embodiment of the invention achieves both a reliable message giving the antenna route choice information and a simple identification of the antenna route to be used for the transmission, whereby the receiving unit will always be aware of the transmission antenna route which is to be used for the transmission. Some embodiments of the invention have the advantage that they need less hash codes for spreading the transmission than in known transmission diversity solutions, when every antenna route does not need its own hash code.

LIST OF FIGURES

The invention will now be described more closely in connection with preferable embodiments and referring to the examples shown in FIGS. 3–11 of the appended drawings, wherein.

DETAILED DESCRIPTION OF THE INVENTION

Figure 1:
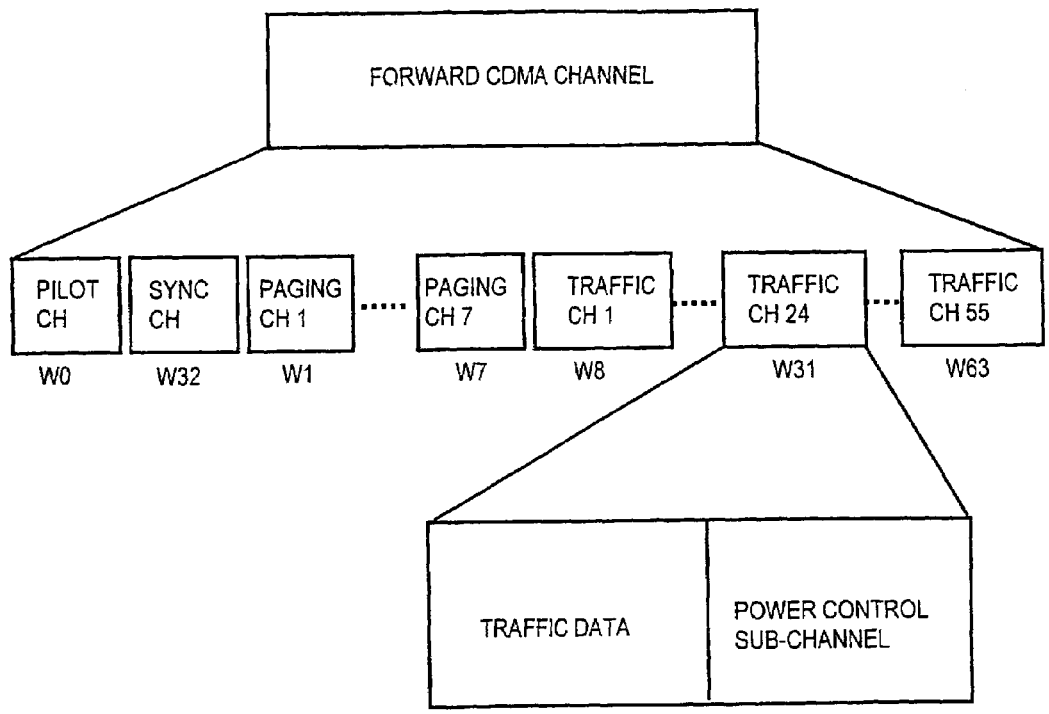
FIG. 1 shows the structure of a downlink CDMA traffic channel.
Figure 2:
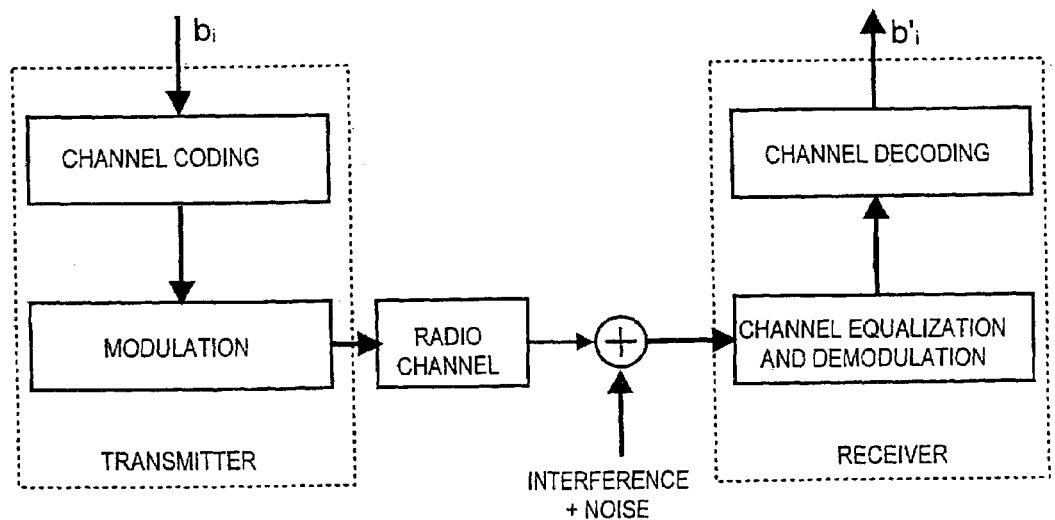
FIG. 2 shows transmission of a signal over a transmission channel.
Figure 3A:
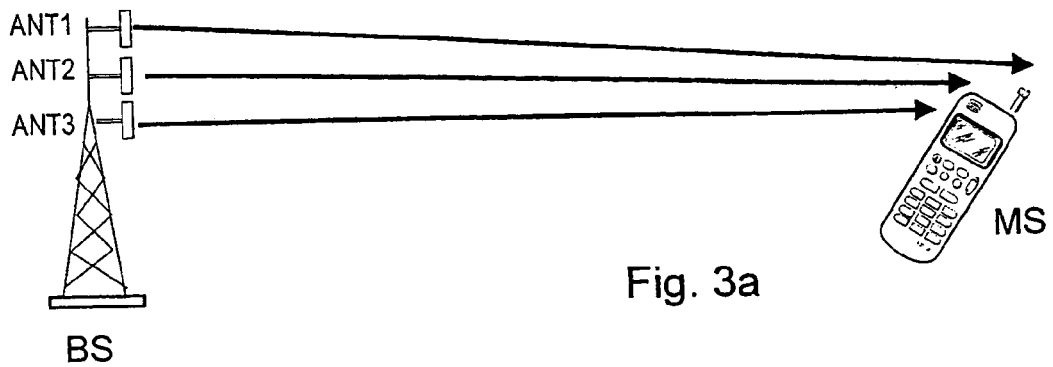
FIGS. 3a–3d illustrate use of transmission antennas in accordance with the invention on a connection between a base station BS and a mobile station MS
Figure 3B:
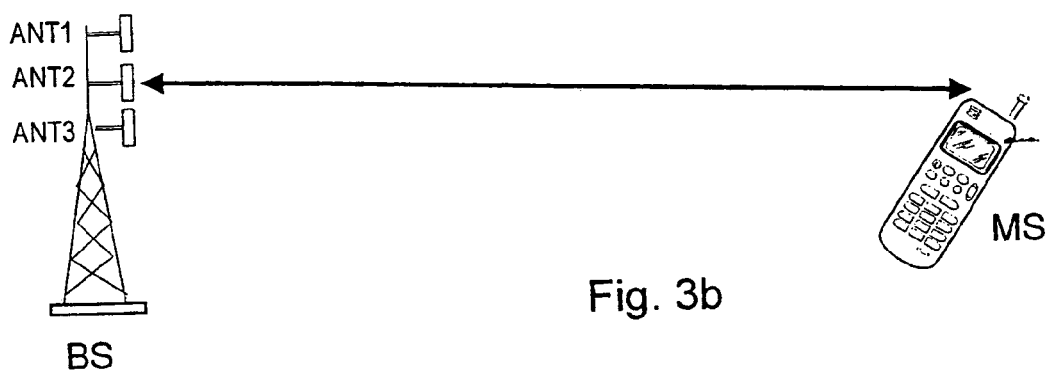

In the following, the invention will be described more closely in the light of a preferable embodiment of the invention and referring to FIGS. 3a and 3b. FIGS. 3a and 3b show by way of example a radio communication between only one base station BS and only one mobile station MS.

In the example shown in FIG. 3a there are three transmission antennas ANT1–ANT3 at base station BS, which antennas are located at a sufficient distance from each other. It is advantageous to locate the transmission antennas at a mutual distance of 10–20 wave lengths at the base station, so that by transmission diversity a difference is achieved in the route travelled by the signal and, on the other hand, so that the delay between the different signal routes would not become too long. The base station transmits through each transmission antenna ANT1–ANT3 on a common channel a broadcast signal intended for all mobile stations, but individually shaped for each antenna branch. The mobile station MS receives the common transmission of all antennas ANT1–ANT3 and of these received signals it determines which one is best, e.g. based on the signal level, the SIR (Signal to Interference Ratio) or the distance attenuation.

In FIG. 3b the mobile station MS notifies the base station BS of its choice of the best antenna branch with the aid of the method of signal shaping which it has detected in the common channel signal of the concerned antenna branch. The transmission of base station BS to mobile station MS is continued based on the antenna choice information received by the base station through one transmission antenna branch only, in the example shown in FIG. 3b through antenna ANT2.

Figure 3C:
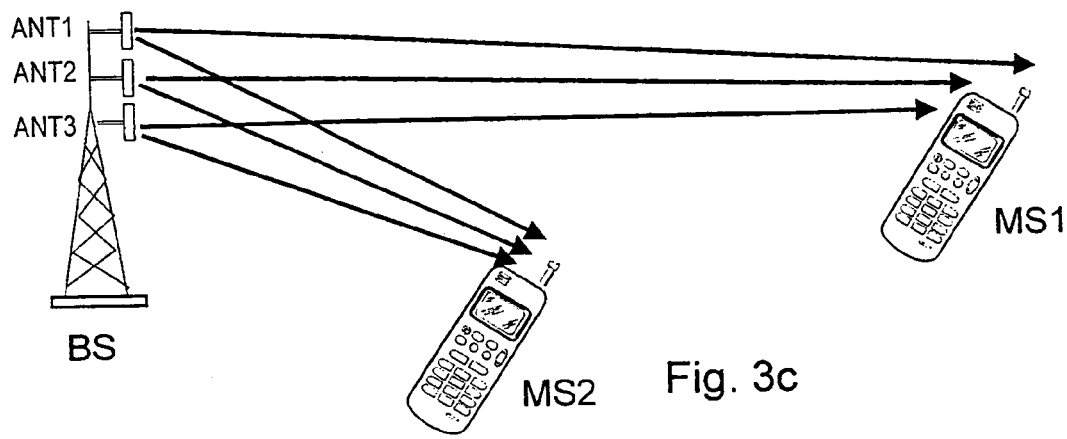
Figure 3D:
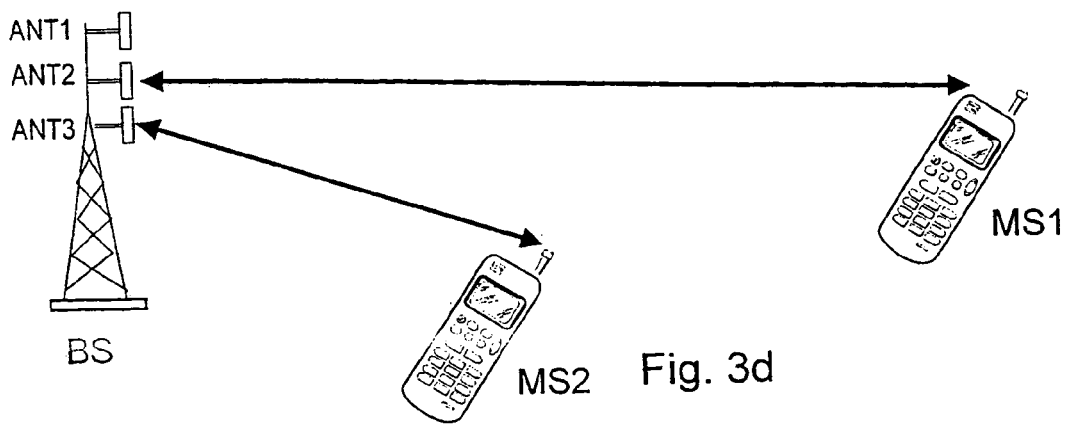

FIG. 3c shows a corresponding antenna choice process in the case of two mobile stations MS1 and MS2. Both mobile stations MS1 and MS2 receive the broadcast signal of all transmission antenna branches of the base station BS. Each broadcast signal is shaped by a antenna branch specific method of signal shaping. Based on the broadcast signals, each mobile station MS1 and MS2 chooses the optimum transmission antenna branch for itself and notifies the base station BS of its choice. In the example shown in FIG. 3d, base station BS continues the communication with mobile station MS1 through transmission antenna ANT2 and with mobile station MS2 through transmission antenna ANT3.

It is advantageous to have base station BS on the traffic channel also transmit an identifier identifying the antenna branch to be used for the transmission or to shape the user data to be transmitted on the traffic channel in accordance with the signal shaping method of the antenna branch to be used for the transmission, whereby mobile station MS is able to verify the antenna branch to be used for the transmission. Hereby mobile station MS identifies, which antenna branch is actually used for the transmission at the base station. The transmission antenna branch used by base station BS may be the same or a different antenna branch than the one chosen by the mobile station as the best antenna branch, depending on how successfully the antenna choice message relayed by the mobile station is interpreted at the base station. With the aid of the emission identifying the antenna branch to be relayed on the traffic channel, mobile station MS, however, is able in accordance with the present invention to check and identify the transmission antenna branch connected for use in the connection.

Figure 4A:
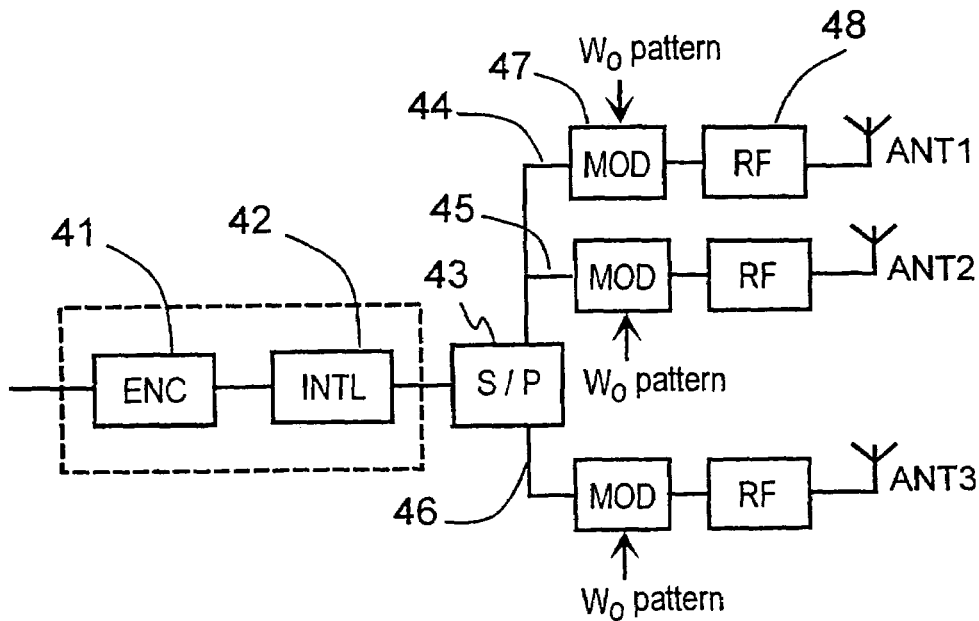
FIGS. 4a and 4b show by way of example the structure of a unit's broadcast embodying the invention.
Figure 4B:
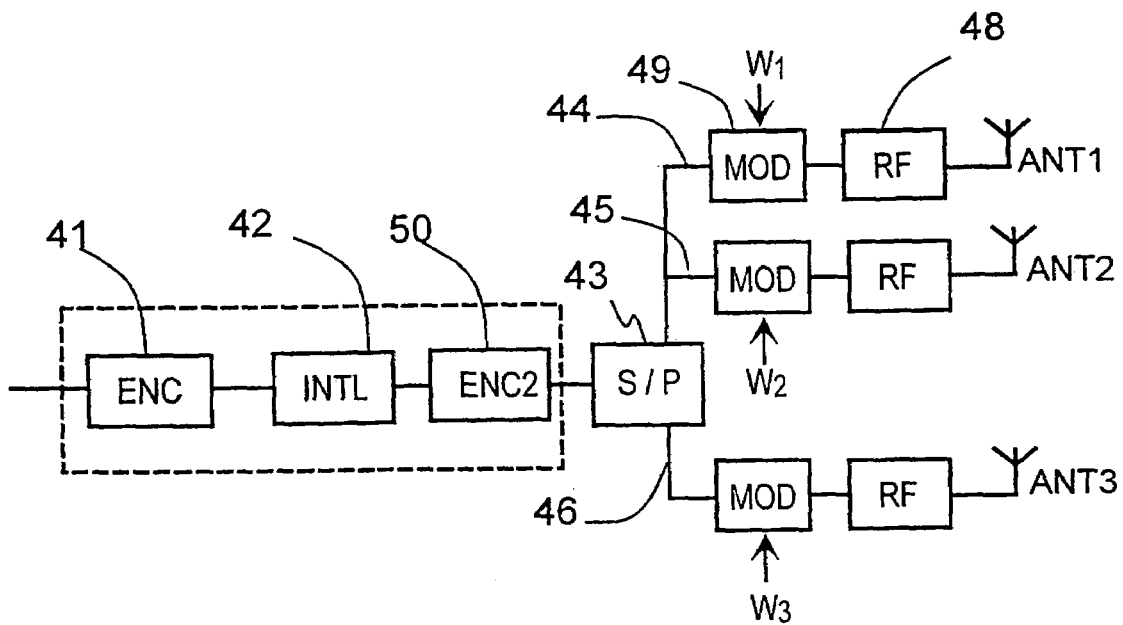

FIGS. 4a and 4b show detailed examples of implementations of the transmission of a common channel in accordance with the present invention for transmission through the antennas of all base stations, as is shown in FIG. 3a described above. The example in FIG. 4a shows those parts of the structure of the transmitting unit which are essential to the invention, e.g. of the transmitter unit at base station BS. The signal to be transmitted may be coded in coder 41 and then the coded signal may be interleaved in interleaving unit 42. The functionality of units 41 and 42 is not necessarily needed, if coding and interleaving of the transmission of the common channel is not desirable, so of these units one or both may be left out. In accordance with the invention. The signal is divided at the SIP unit 43 (serial to parallel) to all transmission antenna branches, in the example shown in FIG. 4a to antenna branches 44–46. In the following, the structure of antenna branches will be described with the aid of antenna branch 44. In the antenna branch leading to antenna ANT1, the signal is scattered, spread and modulated in unit 47. In the example shown in FIG. 4a, scattering is performed in accordance with the invention in all antenna branches using the same hash code $W_0$, however, so that the scattering result of the different antenna branches is different at the symbol level. In unit 47 a symbol pattern of the hash code is thus used for scattering the signal. The RF unit 48 converts the signal from baseband to radio frequency before the signal is transmitted onto the radio path through ANT1.

The structure of the other antenna branches 45 and 46 in FIG. 4a is the same as the one described above, except as regards the symbol pattern of the hash code $W_0$ of unit 47. The symbol patterns of the different antenna branches are preferably mutully orthogonal, whereby the interference caused by transmissions to one another is reduced, especially when the signals arrive in the receiving unit with the same delay. The symbol pattern may be e.g. in the form of +– +– in one antenna branch and in the form of ++ in another antenna branch. The symbol patterns modulate the same hash code. The receiving unit must hereby integrate e.g. over two or four symbols, so that the signals can be distinguished from one another. The receiving unit identifies the signals transmitted from the different antennas by the hash code symbol pattern used in their scattering. Hereby the signal shaping method in accordance with the invention which is established for the antenna branch is such an individual symbol pattern for each transmission antenna branch, by which the signal to be transmitted is shaped, and which thus identifies each antenna branch.

The broadcast of the common channel is preferably transmitted continuously from all antenna branches at an equal standard power. Should the standard power to be transmitted differ in the different antenna branches, information about the transmission power ought to be sent to the recipient in connection with the broadcast, so that the receiving unit, such as mobile station MS, will be able to compare the reception level of the signals it receives from the different antenna branches. The broadcast of the common channel is transmitted constantly from all antenna branches.

FIG. 4b correspondingly shows another example for implementation of the transmission of the common channel. Compared with FIG. 4a, the example in FIG. 4b is additionally provided with a coder ENC2 50 performing repeated coding, owing to which the same information may be supplied to each antenna branch 44–46 as to the others. This coder ENC2 50, too, is optional and it may be left out of the implementation, if desired. The example shown in FIG. 4b also differs from the one described in connection with FIG. 4a as regards the unit performing signal scattering, spreading and modulation in antenna branches 44–46. In unit 49 of antenna branch 44, the signal is scattared by hash code $W_1$, which is an individual hash code for each antenna branch. In antenna branch 45, the scattering is correspondingly performed with hash code $W_2$ and in antenna branch 46 with hash code $W_3$. The different hash codes are preferably mutually orthogonal. The receiving unit identifies the signals transmitted from the different antennas by the hash code $W_i$ used in their scattering. Hereby the signal shaping method according to the invention which is established for the antenna branch is an individual hash code for each transmission antenna branch which identifies each antenna branch.

In addition to the examples shown above, the signal shaping method which identifies the antenna and which is to be arranged for the common channel may be a different frequency offset value to be established in the signal processing in the different antenna branches, or different channel coding, such as CRC (Cyclic Redundancy Check), block coding or convolution coding, or the same hash code used in signal scattering in the different antenna branches may be modulated in parallel one time or many times so that hash codes of different lengths are modulated in each antenna branch, e.g. hash code $W_0$, in one antenna branch, with hash codes $W_0W_0$ and $W_0$–$W_0$, in parallel in another antenna branch, and so on. The signal shaping method to be established for the antenna branch may also be a combination of the shaping methods mentioned above. The signal shaping method established for each transmission antenna branch is preferably orthogonal compared with the signal shaping methods of the other antenna branches, e.g. orthogonal hash codes or symbol patterns.

Figure 5A:
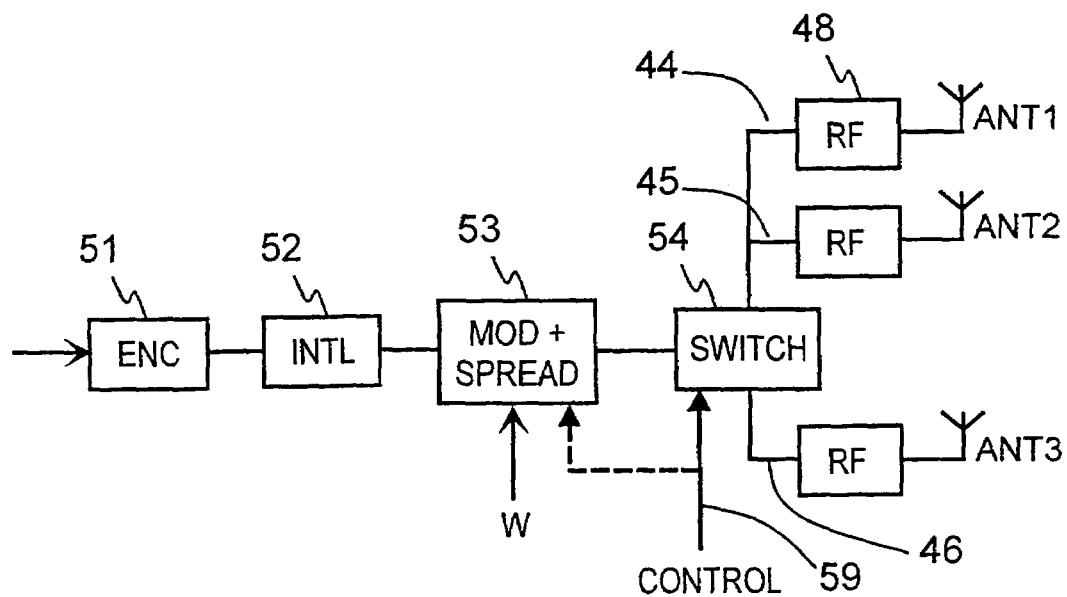
FIGS. 5a and 5b show the structure of a transmitting unit for embodying the transmission of a traffic channel in accordance with the invention.

FIG. 5a shows the structure of a transmitting unit in accordance with the invention as regards the traffic channel transmission. On the traffic channel, the user data is coded in coder 51 and it is interleaved in unit 52. In unit 53 the signal is scattered by hash code W, it is spread and modulated. The operation of unit 53 may be controlled based on an interpretation 59 of an antenna choice message received from the mobile station, so that owing to the signal shaping method according to the invention which is individual for the transmission antenna branch, an identifier identifying the transmission antenna branch is formed on the traffic channel. Such a signal shaping method established for the antenna branch may be e.g. a symbol pattern as described above in connection with the common channel transmission, a hash code, a hash code in parallel once or several times, a frequency offset, channel coding or a combination of those mentioned above. Switch 54 switches to the transmission antenna the shaped signal to be transmitted, based on an interpretation 59 of the received antenna choice message. The functionality of switch 54 may also be implemented by some known state-of-the-art switching arrangement. The signal is converted from baseband to radio frequency in RF unit 48 of the connected antenna branch 44, 45 or 46. The shaped user data signal is transmitted onto the radio path through the antenna of the connected antenna branch. The signals of the other subscriber connections are combined to the transmission antennas before the conversion in RF unit 48.

Figure 5B:
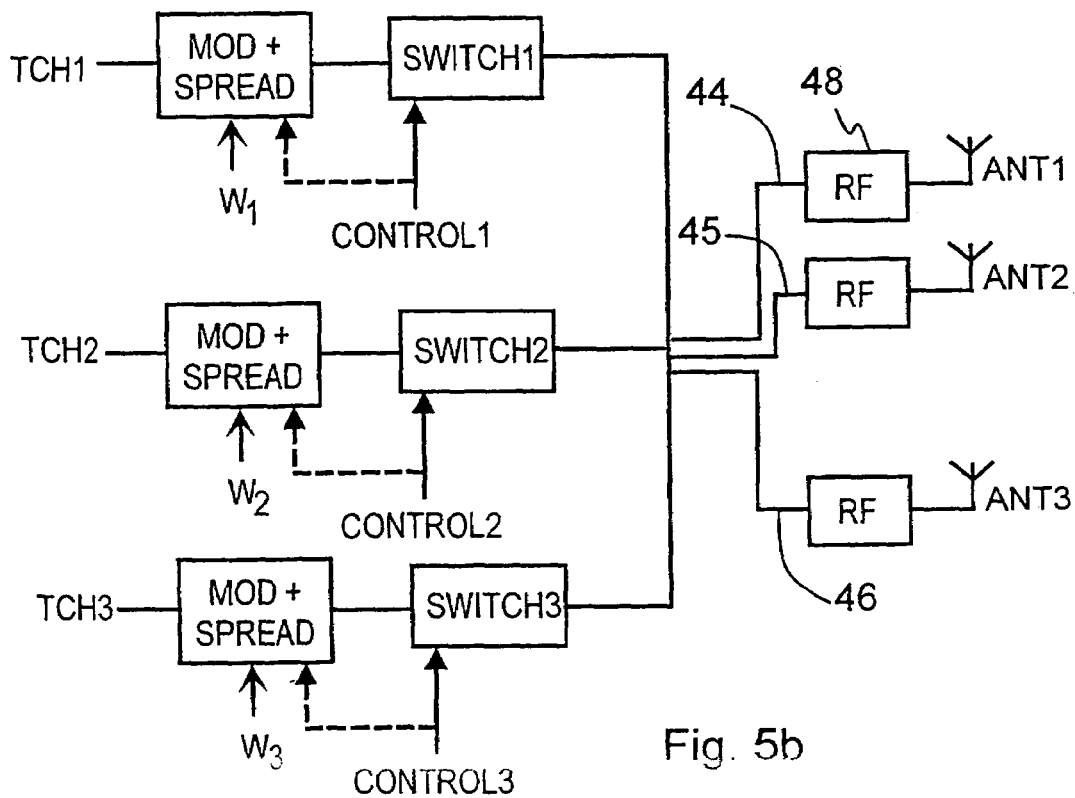

FIG. 5b shows by way of example a combination of the signals of traffic channels TCH1–TCH3 of three subscriber connections before the transmission to the radio path. The signal of traffic channel TCH1 is scattered by hash code W1 and spread out using the switch SWITCH1. The shaped signal of traffic channel TCH1 is connected to the transmission antenna based on an interpretation CONTROL1 of the received antenna choice message. Correspondingly, the same procedure is used as regards the other traffic channels TCH2 and TCH3. The signals of different traffic channels to be connected to the same antenna are combined with each other after the traffic channel specific switches before the RF conversion. When desired, the traffic channel signal may be shaped in accordance with the interpretation of the antenna choice method by a signal shaping method which is individual for the antenna branch before switching of the switch SWITCH1–3.

In accordance with the above description, an antenna branch specific identifier may be added to the signal to be sent on the traffic channel, or the signal to be transmitted may be shaped in accordance with the invention by a transmission antenna specific signal shaping method, so that the mobile station will be able to identify from which antenna branch the transmission has taken place. Thus, signal shaping methods specific to the antenna branches are e.g. the above-mentioned different hash codes, the same hash code with different symbol patterns, a different frequency offset, a different channel coding and/or a different number of the same hash code in parallel. The signal shaping method to be established for the different antenna branches is preferably orthogonal compared with the signal shaping methods of the other antenna branches.

The individual signal shaping method of the antenna branch on the traffic channel may be the same as the one on the common channel or any signal shaping method connected to it, so that the mobile station will identify the connected antenna branch by the signal shaping method and will be able to compare it with the signal shaping method of the antenna branch which it has chosen. The individual signal shaping method for each antenna branch may in the above-mentioned cases be the same for different subscriber connections except in the case of different hash codes. By using the same hash code in different antenna branches the advantage is achieved that less hash codes are needed. In addition, the hash code used for the other subscriber connections need not be changed, when the antenna branch used for one connection is changed.

Figure 6:
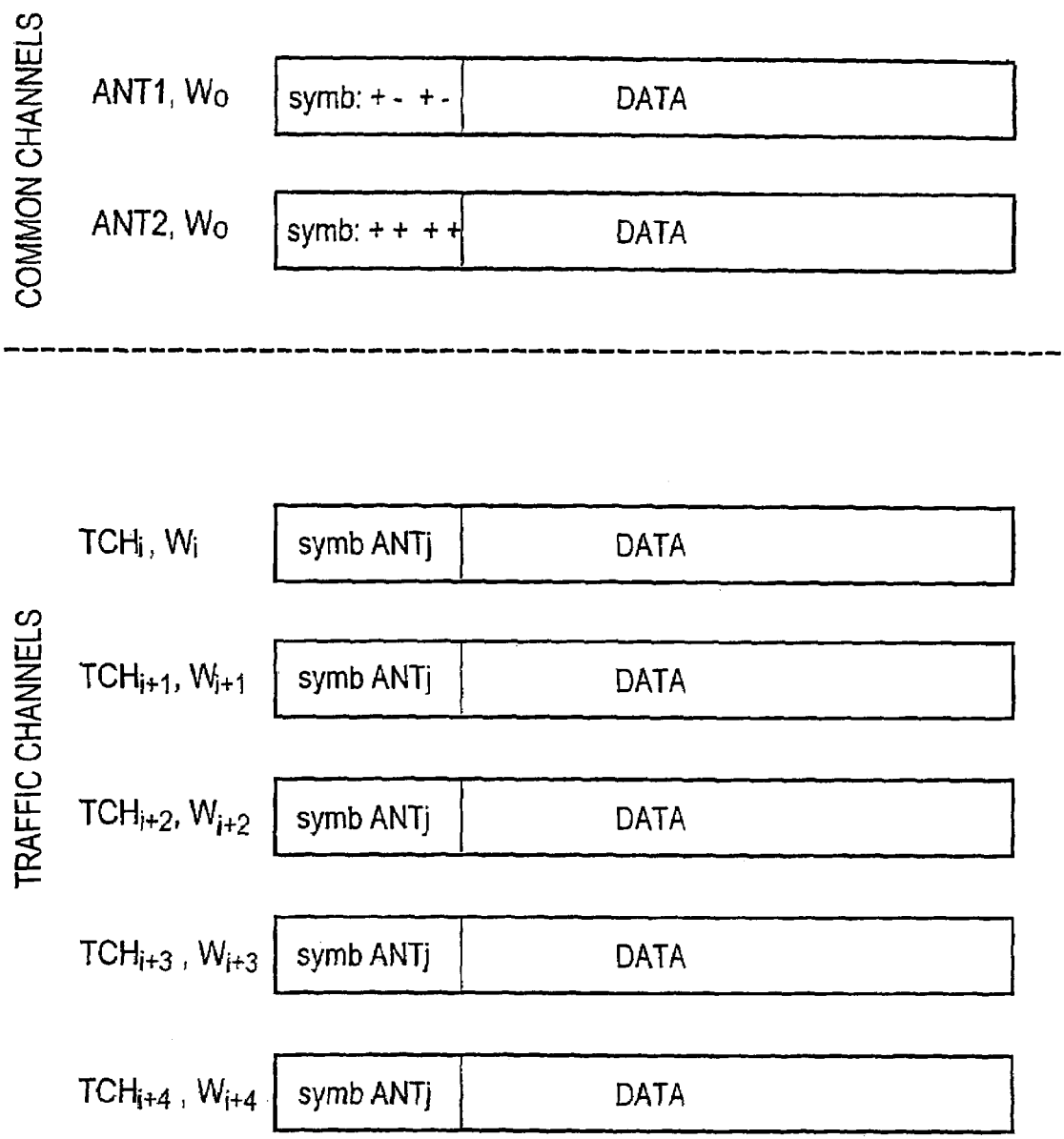
FIG. 6 shows the structure of common channels and traffic channels in accordance with the invention.

FIG. 6 shows the structure of downlink channels in the case of two transmission antenna branches, when an identifier identifying the antenna branch is used on the traffic channels. The case shown as an example in FIG. 6 shows the signal shaping method which was described above in connection with FIG. 4a and which is based on an individual symbol pattern. The common channels of the antenna branches of antennas ANT1 and ANT2 as shown in the figure include a broadcast data item and a symbol pattern which is individual for the antenna branch and which has been used for shaping the bits of the broadcast data item. In the example shown in FIG. 6, both common channels are scattered by hash code $W_0$. The symbol pattern for the antenna branch of antenna ANT1 is in the form of +− +− while the symbol pattern for the antenna branch of antenna ANT2 is in the form of ++ ++. in accordance with the invention, the traffic channels include a user data item and an antenna branch symbol pattern item, which is the symbol pattern of the antenna branch connected for use by each subscriber connection. The symbol pattern may also be used for shaping bits of the user data item. If e.g. for a connection communicating on traffic channel $TCH_i$ an antenna ANT1 is connected in accordance with the invention for use in transmission, the identifier identifying the antenna branch of the traffic channel $TCH_i$ includes the symbol pattern +− +− and the data to be relayed on the traffic channel may be shaped by using this symbol pattern. The traffic channels $TCH_i-TCH_{i+4}$ shown in FIG. 6 are each scattered by their own hash code $W_i-W_{i+4}$. In the beginning of the connection formed by base station BS and mobile station MS, the base station in accordance with the state of the art notifies the mobile station MS on a control channel, e.g. on a call channel, of the hash code to be used in the data transmission. During the connection this hash code preferably remains the same, even if the transmission antenna were to be changed during the communication. The symbol pattern identifying the antenna may be located in a suitable place on the common channel and on the traffic channel. Correspondingly, in the channels shown in FIG. 6 the other signal shaping methods mentioned above as examples are located along with the data bits shaped by them as well as the identifiers identifying the antenna branch.

Figure 7A:
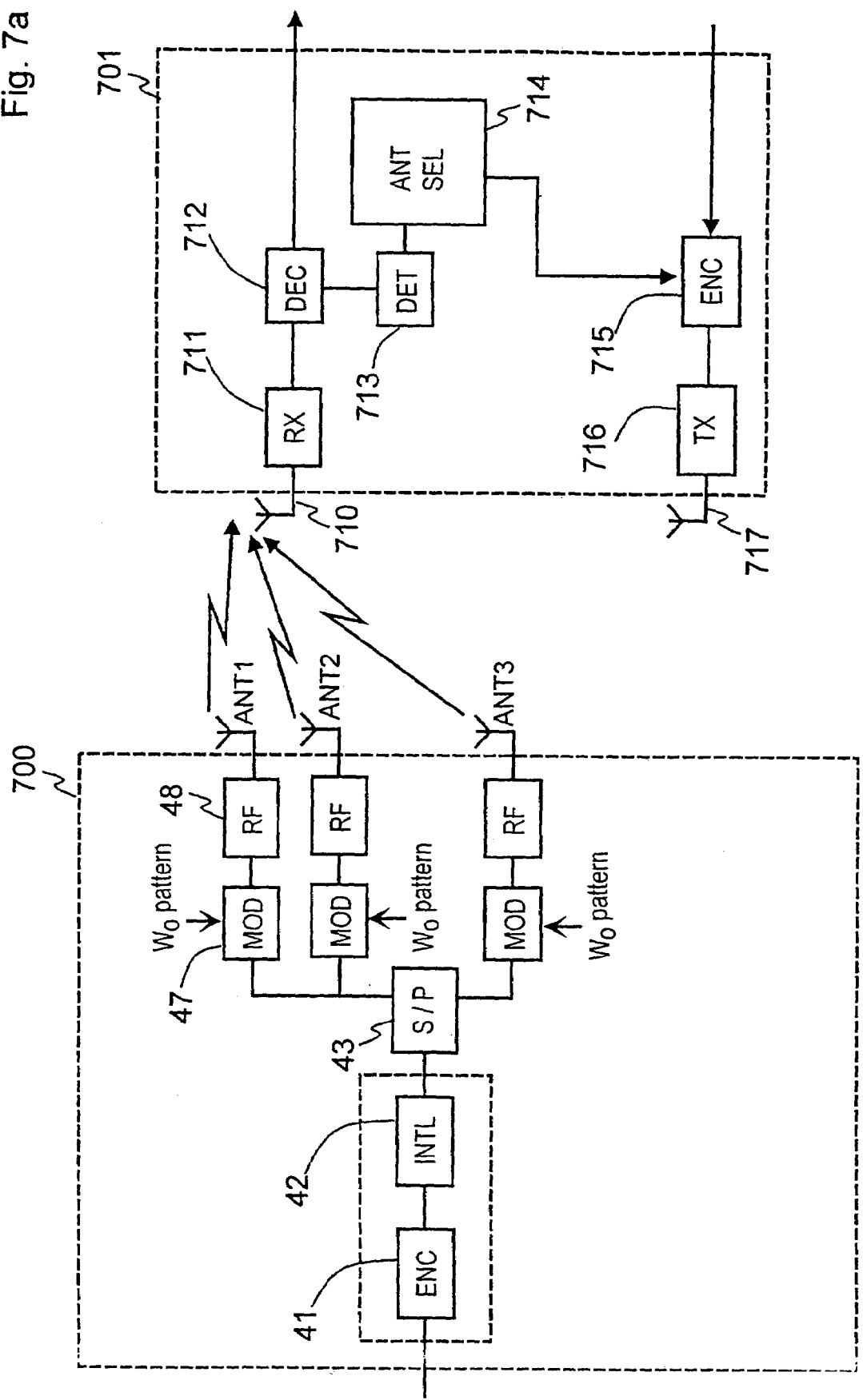
FIGS. 7a and 7b show the structures of a transmitting unit and a receiving unit for embodying the choice of transmission antenna branch in accordance with the invention and for verifying the connected antenna branch.

FIG. 7a shows a comparison of transmission antenna branches in the light of block diagrams of a transmitting unit 700 and a receiving unit 701. The figure shows only those parts of the units 700 and 701 which are essential for the comparison and choice of the broadcast and transmission antenna branches. The structure of the transmitting unit 700 is similar to the structure described in connection with the example shown in FIG. 4a for shaping the common channel signal with antenna branch specific symbol patterns. From all antennas ANT1–ANT3 a common channel signal is transmitted shaped by the individual symbol pattern of each antenna. In the receiving unit, these three signals are received through antenna 710 and in receiver 711 the signal is converted for baseband frequency. In decoder 712 the signal is demodulated and the spreading and scattering of the signal are undone. The broadcast data is conducted for further processing elsewhere in the receiving unit. A channel estimate for each signal is also formed in the decoder. Detector 713 compares the received signals with one another, e.g. the signal level, the signal-to-interference ratio SIR or the distance attenuation, and it detects the individual signal shaping method of each signal. The signal shaping method is detected before decoding. The antenna choosing unit 714 chooses an antenna branch suitable for the transmission based on the comparisons performed by detector 713, e.g. that antenna branch which produces the best signal level. The antenna choosing unit 714 transmits the signal shaping method of the chosen antenna branch to coder 715, which adds this emission to the other coded data which is intended for transmission to unit 700, either before or after coding. The information to be transmitted to the transmitting unit 700 is shaped in transmitter unit 716 into the form required on the radio path and it is transmitted by way of antenna 717 onto the radio path in a state-of-the-art manner.

Figure 7B:
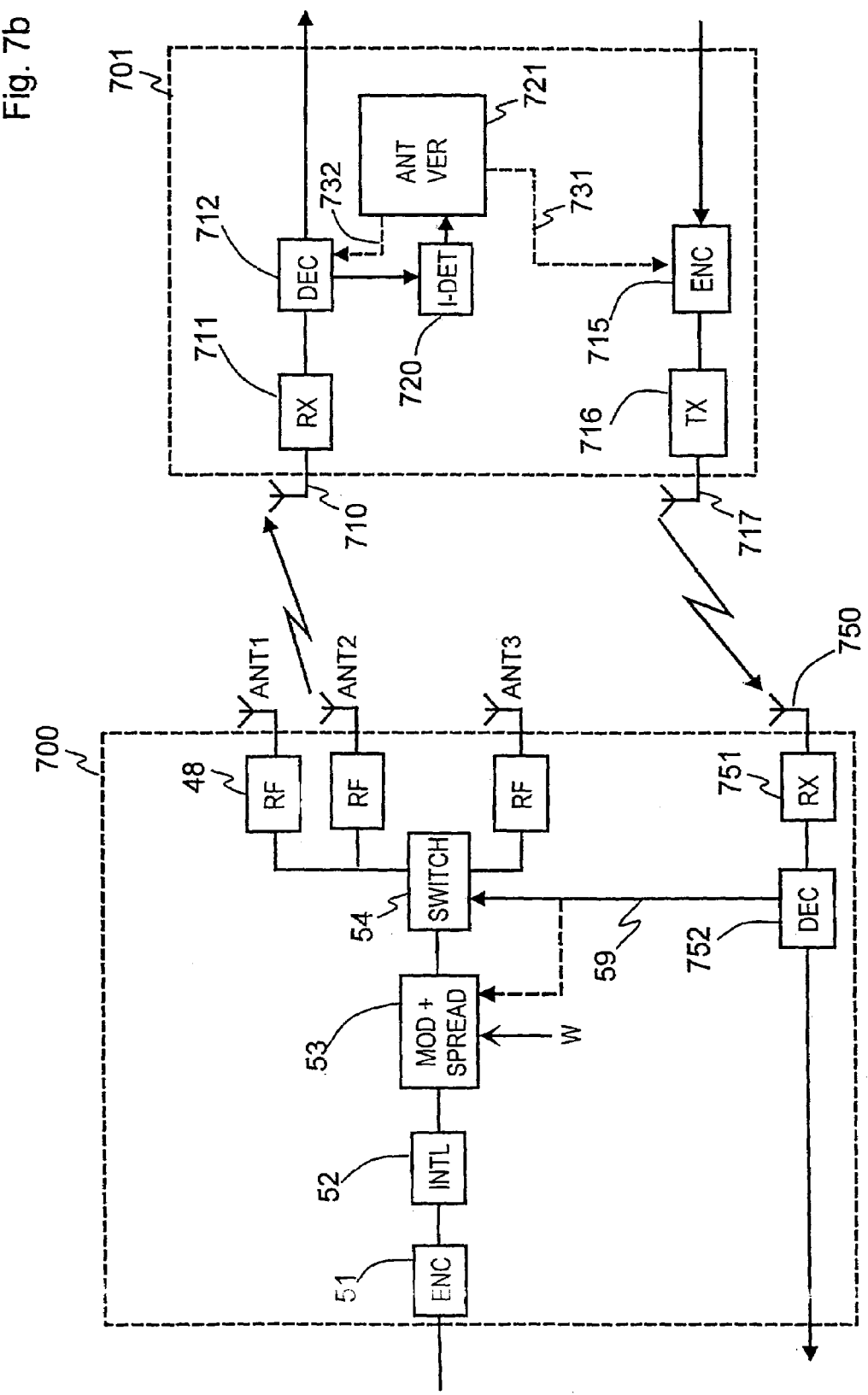

FIG. 7b shows a connection of an antenna branch to a traffic channel transmission in accordance with the invention in the light of block diagrams of a transmitting unit 700 and a receiving unit 701. The figure shows only those parts of units 700 and 701 which are essential for this functionality.

The antenna 717 of the receiving unit 701 thus in the manner described in connection with FIG. 7a transmits an emission stating the signal shaping method of the chosen antenna branch along with the other transmission intended for the transmitting unit 700. The antenna 750 of the transmitting unit 700 receives this signal and leads it to the receiver 751 for conversion. The antenna 750 may also be one of the antennas ANT1–ANT3. In receiver 751 the baseband-converted signal is led to decoder 752, which demodulates, undoes the spreading and scattering of the signal in a state-of-the-art manner and separates the antenna choice message from the other data. The received emission of the signal shaping method of the antenna branch is led by route 59 to control the connecting to the antenna branch used for the transmission of the user data to be transmitted from transmitting unit 700 to receiving unit 701 and possibly to control the addition of the antenna branch specific identifier to the user data or the shaping of the user data. As regards the transmission side of the traffic channel, the structure of unit 700 is similar to the structure described in connection with FIG. 5a, whereby the coded and interleaved user data is scattered by the hash code reserved for the connection and it is spread out and modulated. In addition, the user data may be shaped with the signal shaping method established for the antenna branch connected for the transmission or an antenna branch specific identifier may be added to the user data. Signal shaping methods are e.g. antenna branch specific hash codes, symbol patterns, the use of a hash code in parallel once or several times, channel coding and/or frequency offset. The antenna to be used for the transmission is determined by the control 59, which controls switch 54 to switch to the transmitting antenna the shaped signal to be transmitted, in the example shown in FIG. 7b to antenna ANT2. The RF unit 48 of the antenna branch of antenna ANT2 converts the signal to be transmitted from baseband to radio frequency in a state-of-the-art manner.

The traffic channel user data transmitted through antenna ANT2 is received through antenna 710 of the receiving unit 701 and it is led after the conversion in receiver 711 to decoder 712, which demodulates, undoes the signal spreading and scattering. The traffic channel user data is supplied elsewhere in the receiving unit for further processing. If an emission identifying the transmission antenna branch has been added to the traffic channel, the identifier identifying the antenna branch or the signal shaping method is detected from the received signal in detector 720 and it is led to checking unit 721 for verification of the antenna branch. The detector 720 may be implemented so that it is integrated with detector 713 in FIG. 7a. The checking unit 721 compares the identifier identifying the antenna branch or the signal shaping method with the corresponding ones of the antenna branch chosen earlier as transmission antenna branch in unit 701. If the identifiers or shaping methods are similar, it has been ensured that the the antenna branch connected for transmission by transmitting unit 700 is the same as the optimum antenna branch chosen by receiving unit 701. If the identifiers or shaping methods are different from each other, checking unit 721 may take the steps to be presented in the following, in accordance with the operating instructions established for the unit.

Firstly, checking unit 721 may notify decoder 712 through control route 732, that the decoder must use the channel estimate of another antenna branch for decoding the signal. Secondly, checking unit 721 may through control route 731 control the transmitting side of receiving unit 701 to change the transmission settings in the transmission of the next antenna choice message. The signal including the next message may e.g. be controlled so that it is transmitted at a higher power or it may be processed with more powerful coding. Thirdly, checking unit 721 may make statistics of the success of the antenna connection of transmitting unit 700 according to the antenna choice messages given by receiving unit. If the success of the antenna connection falls short of a pre-established threshold level, checking unit 721 may through route 731 control the transmitting side of receiving unit 701 to send to transmitting unit 700 a message that the antenna choice functionality may/must be turned off. Having received this message, transmitting unit 700 will choose the antenna branch for transmission in some state-of-the-art manner.

Figure 8:
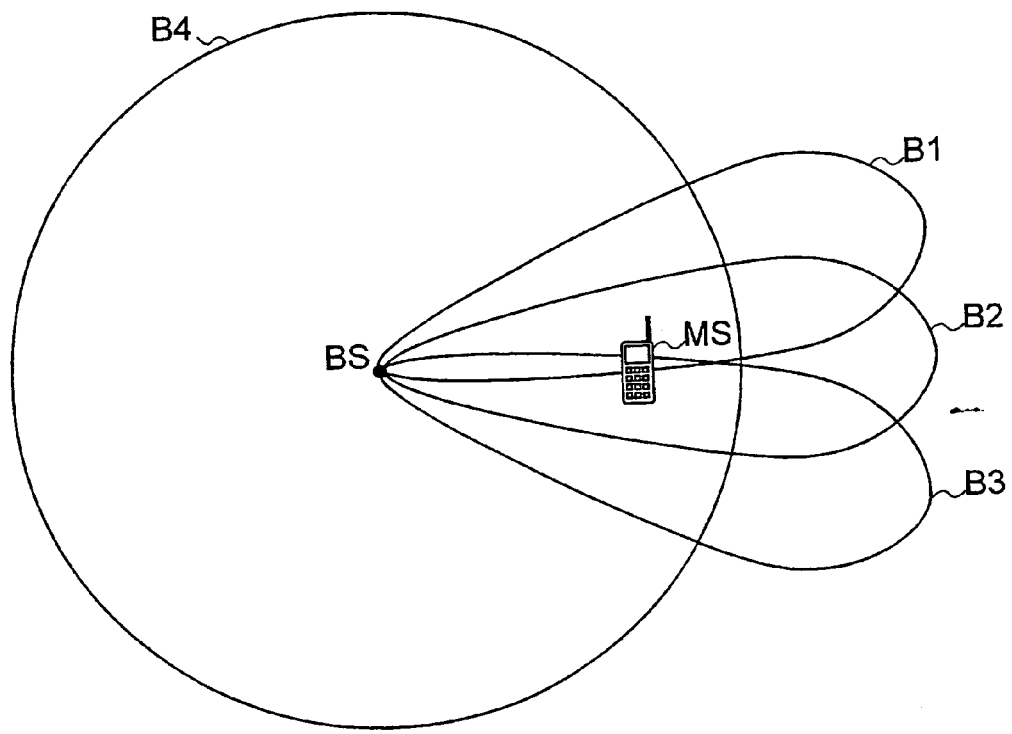
FIG. 8 illustrates the use of transmission antenna beams in accordance with the invention on a connection between a base station BS and a mobile station MS.

The foregoing was a description of a preferred embodiment of the invention in a case where several transmission antenna branches are used. In the following, the preferred embodiment of the invention will be described with reference to FIG. 8 in a case where several antenna beams of a variable beam antenna are used. FIG. 8 shows antenna beams B1–B3 of a variable beam antenna group located at base station BS. For the sake of clarity, the figure shows three antenna beams only, but when using a dynamic antenna, more such antenna beams can of course be formed. FIG. 8 also shows the antenna beam B4 of an omnidirectional antenna. Each one of these antenna beams can be understood as corresponding to one transmission antenna branch of the example described above. In accordance with the present invention, base station BS transmits a common channel through each antenna beam B1–B4. The signals to be transmitted through the different antenna beams have been shaped in the manner described above by an antenna beam specific signal shaping method. Mobile station MS receives all common channel signals, it compares the signals with one another and chooses the optimum transmission antenna beam. Mobile station MS notifies the base station of its antenna beam choice among the data to be transmitted. Based on the received antenna beam choice message, base station BS connects the user data to be transmitted to one antenna beam and shapes the user data to be transmitted with the signal shaping method of the transmission antenna beam which is to be used. Mobile station MS verifies the transmission antenna beam used for the transmission by this signal shaping method and, if required, it may take e.g. the steps presented above in case of a false antenna beam connection.

Figure 9:
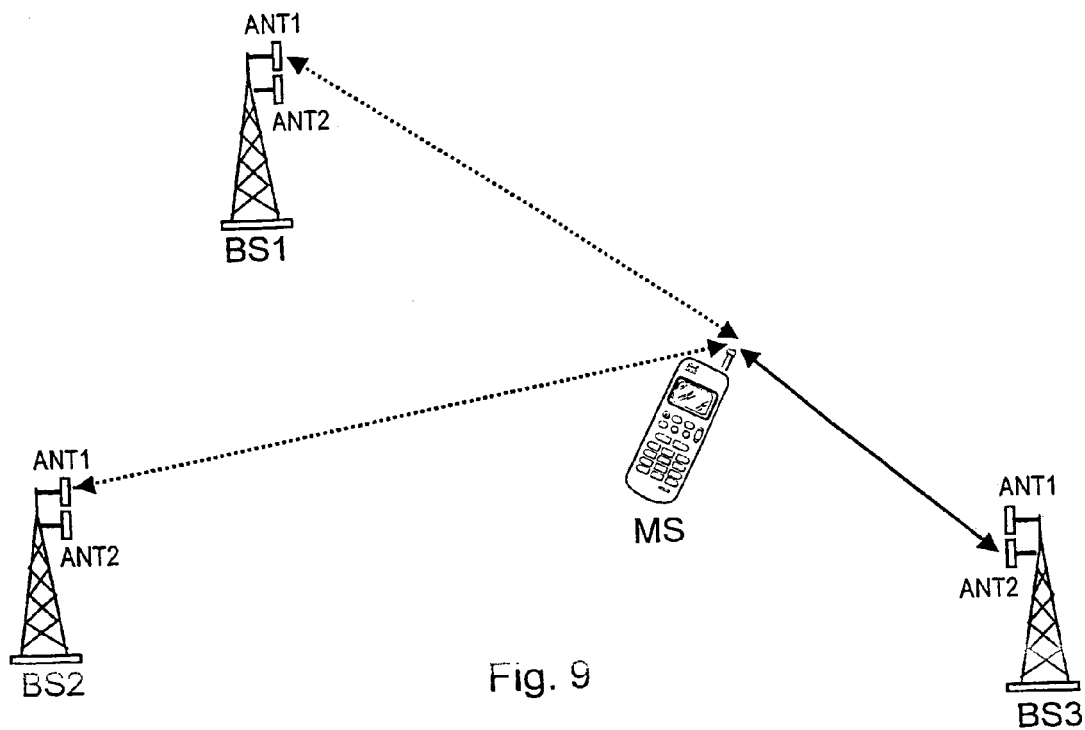
FIG. 9 shows by way of example a situation where the functionality in accordance with the invention is implemented on a simultaneous connection between one mobile station MS and several base stations BS.

The invention was described above in the case of a connection between one base station BS and one mobile station MS. FIG. 9 shows the first embodiment of the invention in a situation, where mobile station MS is simultaneously connected with more than one base station, but the functionality according to the invention is applied to one connection only. In the example shown in FIG. 9, the functionality according to the invention is applied to the connection between mobile station MS and base station BS3, whereby for the connections between mobile station MS and base stations BS1 and BS2 some such transmission antenna route is used, which is chosen by some state-of-the-art method. In the situation shown in FIG. 9, e.g. in a soft handover situation, base station BS3 thus through all its transmission antennas ANT1 and ANT2 transmits a common channel, whose signal has been shaped by a transmission antenna beam specific signal shaping method. Mobile station MS compares the received signals with one another and chooses the optimum transmission antenna branch for base station BS3. Mobile station MS transmits to the base stations the antenna choice message among the data to be transmitted, but only base station BS3 interprets this data and uses the received and interpreted data for connecting the transmission antenna branch. Base station BS3 transmits user data intended for mobile station MS through the antenna branch which it has connected for the transmission. To this user data may be added an emission identifying the connected transmission antenna branch as described above, mobile station MS may verify the transmission antenna branch of base station BS3 by the identifier or signal shaping method which it has detected from the received signal and it may when required take e.g. the steps presented in connection with the description of FIG. 7*b*. In a soft handover situation as the one shown in FIG. 9, the mobile station MS may e.g. in the soft handover message notify the network of the connections of base station BS to which the functionality of the invention is to be applied.

Figure 10:
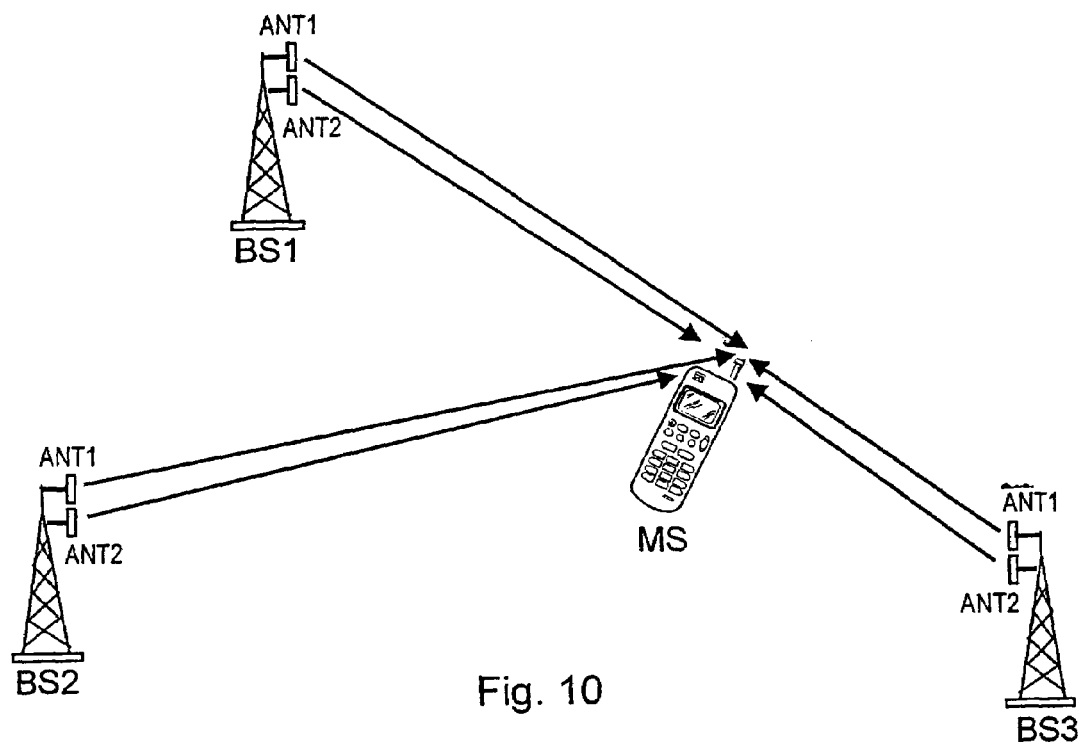
FIG. 10 shows by way of example a situation where the functionality in accordance with the invention is implemented in a broadcast according to the invention between one mobile station MS and several base stations BS.

FIG. 10 shows the method in accordance with the invention in a case of a broadcast signal of several base stations. According to the invention, through each antenna of the base stations BS1–BS3 shown as examples in FIG. 10 such a broadcast signal is transmitted, which includes an individual emission identifying the transmission antenna branch. Mobile station MS receives these signals and based on them it chooses the optimum transmission antenna branch in the same manner as in the case of one base station. Mobile station MS sends a message of its antenna choice to the network. Based on the received antenna choice message, some transmission antenna ANT1 or ANT2 of some base station BS1–BS3 is connected for the communication. In a case of several antennas, the antenna choice message may have to be sent with several bits, so that each antenna will be identified in a manner different from the others. Hereby the bits of the antenna choice message may also be coded better than normally in order to ensure a safer data transmission. This example can be understood as describing a swift hard handover situation.

In another embodiment of the invention, an emission identifying the antenna branch is also formed in the broadcast signal by adding to the signal an identifier which is individual for each antenna branch. Hereby in a state-of-the-art manner such a common channel is transmitted through all antenna branches, to which, besides the broadcast data, is added an identifier which is individual for each antenna branch. Mobile station MS receives all these signals and compares the signals with one another and chooses the optimum signal for reception hereafter. Mobile station MS makes known this antenna branch identifier of its choice to base station BS, which upon studying the message of the mobile station will transmit user data through that antenna branch, which the base station BS understood to be the choice of mobile station MS. Through the connected transmission antenna branch user data is transmitted in accordance with the invention on the traffic channel and, when desired, the individual identifier of the antenna branch, which when received and interpreted by mobile station MS enables the mobile station to verify the used transmission antenna branch and when required to take steps in case the transmission antenna branch was misinterpreted at the base station.

Corresponding to the above description of the preferred embodiment of the invention with reference to FIG. 8, also a secondary embodiment of the invention may be implemented by using instead of transmission antenna branches transmission antenna routes, e.g. transmission antenna beams. Also the soft handover situation presented above in connection with the description of FIG. 9 or the functionality of the example shown in FIG. 10 may be implemented by the secondary embodiment of the invention.

Figure 11A:
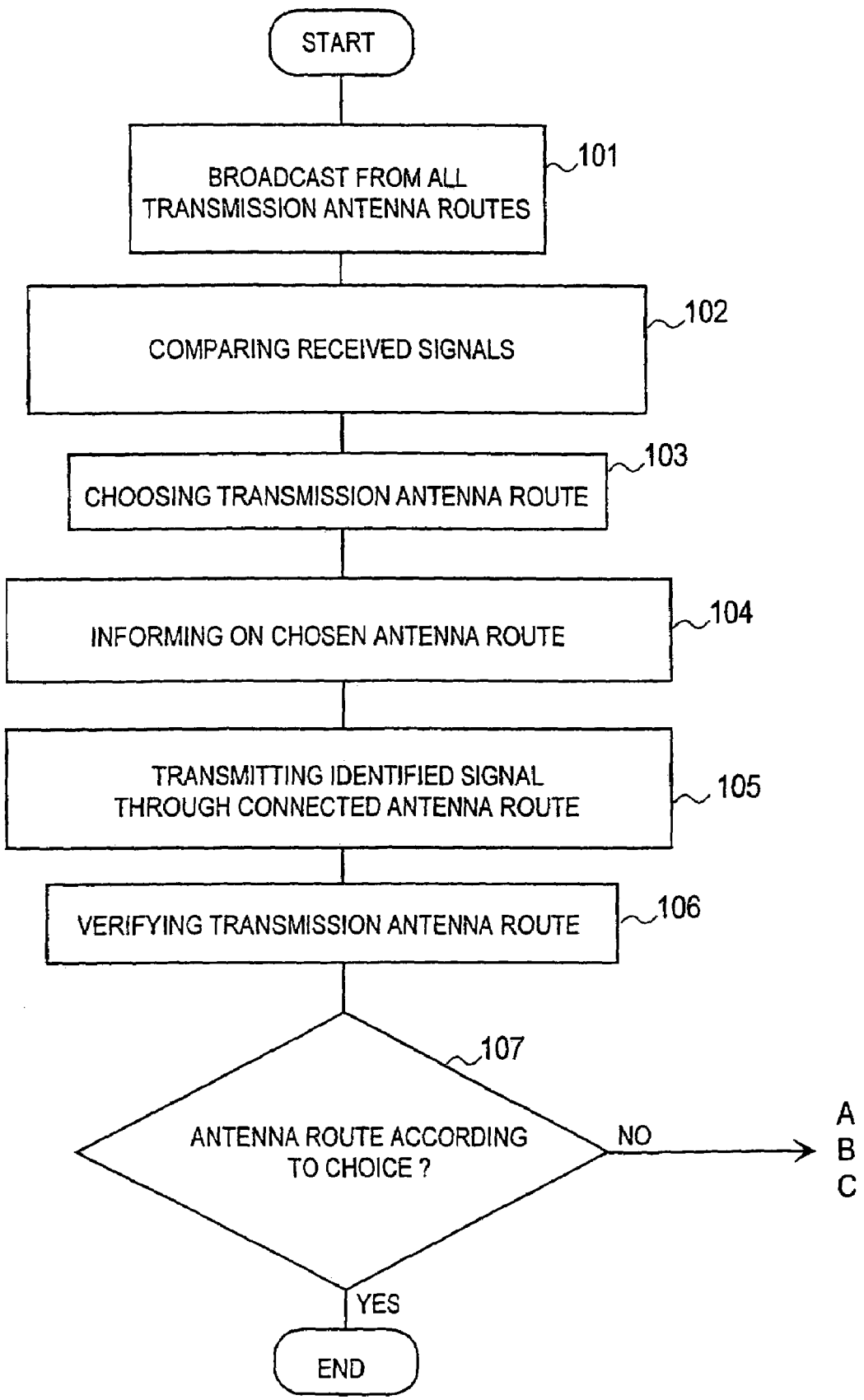
FIGS. 11a and 11b are flow charts of the method in accordance with the invention.
Figure 11B:
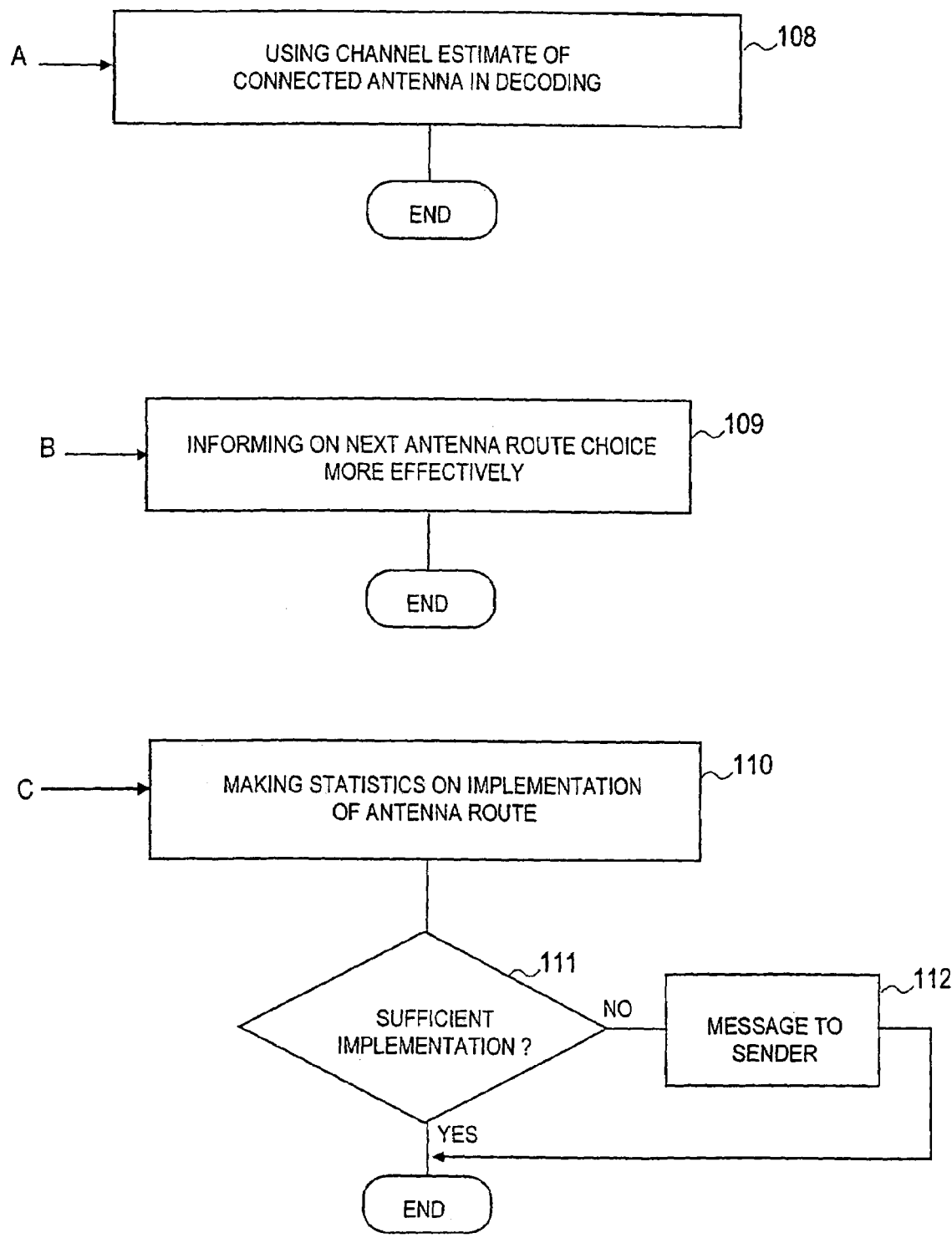

FIGS. 11a and 11b are flow charts of the method according to the invention. At point 101 the base station transmits a broadcast signal through all its transmission antenna routes, such as from all transmission antennas and/or antenna beams. Each broadcast signal includes an individual emission identifying the transmission antenna route, such as a signal shaping method or a route identifier. At point 102 mobile station MS compares the received common channel signals, e.g. based on the signal level, the signal-to-interference ratio or the distance attenuation. Based on these signals, mobile station MS chooses the optimum transmission antenna route (point 103) and notifies the base station BS of its choice of antenna route (point 104). The antenna route choice message from mobile station MS to base station BS may be relayed by symbol puncturing in an uplink signal, such as a power control command, or by time multiplexing. The bits of the antenna route choice message may also be used to replace at least some of the power control bits to be transmitted in the uplink signal, however, preferably in such a manner that power control will still succeed in a state-of-the-art manner. The bit or bits stating the choice of antenna route can also be effectively coded against possible transmission errors. Based on the received antenna route choice message, base station BS connects one antenna route for the traffic channel transmission and through this antenna route it transmits a user data signal, which preferably includes an emission identifying the connected antenna route (point 105). At point 106 verification takes place in the mobile station of the connected transmission antenna route based on the emission identifying the antenna route which is detected from the received signal. At point 107 a check is made in mobile station MS, of whether the connected antenna route is in accordance with the chosen optimum antenna route. If the connected route is not in accordance with the choice, some of the alternative procedures A, B or C shown in FIG. 11b will be carried out. In procedure A, the channel estimate of the connected antenna route is used for the decoding in the mobile station (point 108). In procedure B, the next antenna route choice is stated more effectively from mobile station MS to base station BS (point 109), e.g. at a higher transmission power or by coding the message with a better channel coding. In procedure C, statistics are made of antenna route choice implementation (point 110). At point 111 a check is made of whether the antenna route choice has been successfully implemented a sufficient number of times. If the choice has failed too often in relation to an established threshold value, a message of this matter is transmitted from mobile station MS to base station BS (point 112). Mobile station MS may command/request the base station to turn off the functionality according to the invention or it may allow the base station hereafter freely to choose the antenna route to be connected.

Figure 12:
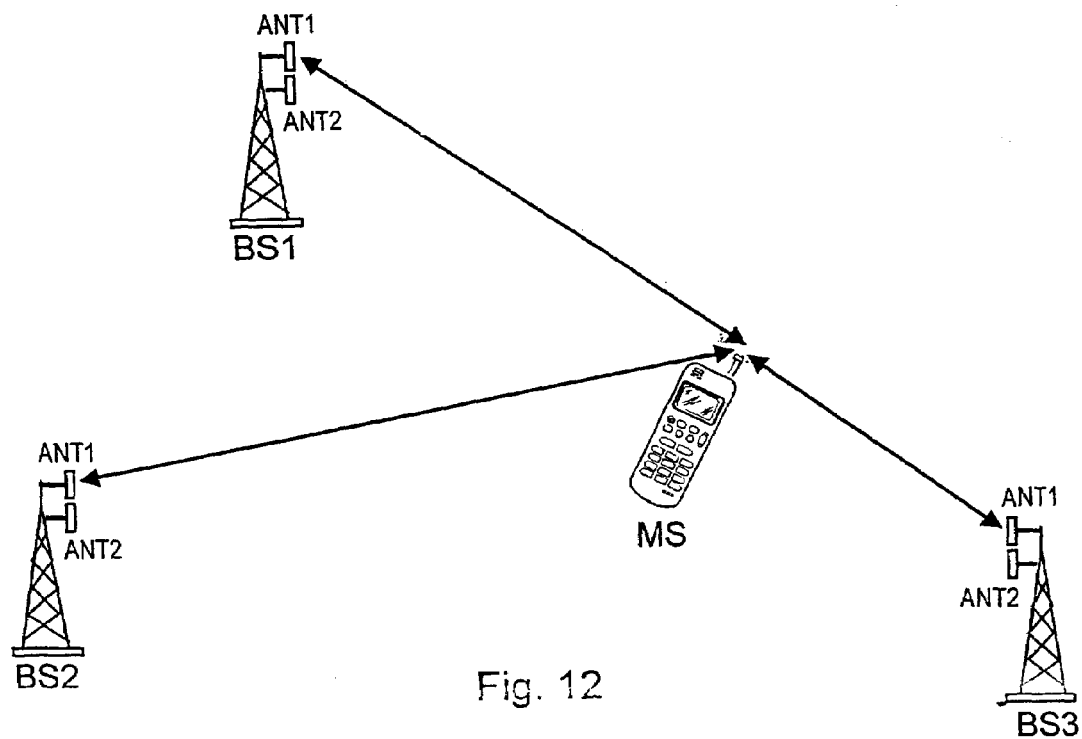
FIG. 12 shows by way of example another situation where the functionality in accordance with the invention is implemented on a simultaneous connection between one mobile station MS and several base stations BS.

FIG. 12 illustrates the functionality of a third embodiment of the invention. In the third embodiment of the invention, mobile station MS is connected with more than one base station at the same time, e.g. in a soft handover situation, and it chooses the transmission antenna branches of these base stations in the manner according to the invention. In the example shown in FIG. 12, mobile station MS is connected with base stations BS1–BS3 at the same time. in each one of these base stations there are two transmission antennas ANT1 and ANT2. In accordance with the above description, each base station BS1–BS3 transmits a common channel through all its transmission antennas ANT1–ANT2. The signals to be transmitted through the difference antenna branches include an emission identifying the transmission antenna branch, e.g. in the manner described above a signal shaping method or an antenna branch identifier, which differs from the emission identifying the other antenna of the same base station. The first antennas ANT1 and the second antennas ANT2 of the different base stations preferably have corresponding emissions identifying the antenna. Mobile station MS receives all common channel signals, in the case shown in FIG. 12 six common channels, and compares the received signal formed jointly by the antennas ANT1 of all base stations with the signal formed jointly by the antennas ANT2 of all base stations, e.g. the formed signal level, the signal-to-interference ratio or the distance attenuation. Mobile station MS chooses the optimum transmission antenna group ANT1 or ANT2 and transmits to the base stations an antenna choice message among the data to be relayed to the base stations. The base stations receive the message and according to their interpretation they connect one of their transmission antenna branches as the antenna branch to be transmitted. User data may be shaped on the traffic channel in such a way that at the same time an emission identifying the antenna branch to be used for the transmission is relayed to the mobile station, e.g. the signal shaping method or the antenna branch identifier. From this emission, the mobile station MS verifies the transmission antenna branch used by each base station. If the connection of the transmission antenna branch was not successful at all base stations in accordance with the message of the mobile station, the mobile station may take e.g. the steps presented in connection with the description of FIG. 7b.

The choice and connection of antenna route according to the invention may be carried out in time at standard intervals, e.g. every fourth transmission time slot, or at any random moment.

In a fourth embodiment of the invention, the functionality according to the invention can be turned off for the time of a soft handover situation. If the choice of transmission antenna route according to the invention is performed at standard intervals of time, this may be implemented e.g. by a message from mobile station MS to the network in a soft handover message. Mobile station MS may make known in this message, that no antenna route choice message in accordance with the invention will be transmitted for the time being. When the soft handover situation is over, mobile station MS may send to the network a message that the choice of antenna route continues or it may simply send the antenna route choice message to the base station among the data which is to be sent to the base station. If the choice of transmission antenna route is performed at a random moment, the functionality according to the invention can be most easily turned off for the time of a soft handover situation in such a way that mobile station MS does not transmit any antenna route choice messages during the soft handover situation, but only after this situation.

In a fifth embodiment of the invention, the base station transmits essentially at the same time through its several transmission antenna routes to mobile station MS on the traffic channel an identifier identifying the individual transmission antenna route, e.g. in the case shown in FIG. 3a through transmission antennas ANT1–ANT3. Mobile station MS receives the traffic channel signal of all transmission antenna routes and from these received signals it determines which one is best, e.g. based on the signal level, the SIR (Signal to Interference Ratio) or the distance attenuation. Mobile station MS notifies base station BS of the best transmission antenna route of its choice with the aid of an identifier which it has perceived in the traffic channel signal of the concerned transmission antenna route. With the aid of bit sequences of the identifier it is also possible to improve the comparison of signals of the transmission antenna routes in the receiving unit. Using these it is e.g. possible to calculate the channel power or channel estimates for the different transmission antenna routes. The transmission of user data to mobile station MS is continued on the basis of the antenna choice information received by the base station through one transmission antenna route only, in the example shown in FIG. 3b through antenna ANT2. The choice of transmission antenna route in the receiving unit is preferably made from the traffic channel signals of one time slot for the user data transmission of the following time slot. Thus, on the traffic channel of each transmission antenna route an identifier is transmitted for the choice of antenna route, but user data is transmitted only through one transmission antenna route. The transmission antenna routes are e.g. transmission antenna branches or transmission antenna beams.

It is advantageous that in the fifth embodiment of the invention base station BS also among the user data transmits on the traffic channel an identifier identifying the transmission antenna route for use in the transmission or that it shapes the user data to be transmitted on the traffic channel in accordance with the signal shaping method of the transmission antenna route to be used for the transmission, whereby mobile station MS will be able to verify the transmission antenna route to be used for the transmission, as has been presented above in connection with the description of the other embodiments.

Transmission antenna route specific signal shaping methods are e.g. the different hash codes presented in connection with the other embodiments, the same hash code with a different symbol pattern, a different frequency offset, a different channel coding and/or a different number of hash codes in parallel. The signal shaping method to be established for different transmission antenna routes is preferably orthogonal in comparison with the signal shaping methods of the other antenna routes. The individual signal shaping method of the transmission antenna route or the identifier added to user data on the traffic channel may be the same as the identifier used for the choice of antenna on the traffic channel or some signal shaping method or identifier connected thereto, so that the mobile station will identify the connected transmission antenna route and will be able to compare it with the individual identifier of the transmission antenna route of its choice. The individual identifier is added to the traffic channel e.g. by symbol puncturing, time multiplexing or code multiplexing. The identifier to be used in the choice of a transmission antenna route may be transmitted on traffic channels through different transmission antenna routes at the same time and/or with time division. Orthogonal symbol patterns or hash codes are preferably used in simultaneous transmission. In time division transmission, the bit sequence of the identifier may be the same as such, when it is possible owing to the time division to interpret the identifier individually for the different antenna routes. For example, in the case of two antenna routes, it is possible through the first transmission antenna route on the traffic channel to transmit identifier P1 P2 - - and through the second transmission antenna route the identifier - - P1 P2, wherein '-' means that there is no transmission through the route. To form an individual identifier for the transmission antenna route one may also use any combination of the methods mentioned above.

In the fifth embodiment of the invention, the structure of downlink traffic channels is similar to the traffic channels of the example shown in FIG. 6. According to the invention, the traffic channels include a user data item and the antenna route's symbol pattern item, which is the symbol pattern of the antenna route connected for use by each subscriber connection. The symbol pattern may also be used for shaping the bits of the user data item. The symbol pattern identifying the antenna route may be located in a suitable place on the traffic channel. Correspondingly, the other signal shaping methods mentioned above as examples, the data bits shaped by them as well as the identifiers identifying the antenna route are located in the traffic channels shown in FIG. 6. If such an identifier is also used on the traffic channel which verifies the antenna route connected for transmission of user data, the symbol pattern item may be split up, whereby e.g. the first two bits indicate the identifier for use in the choice of antenna route while the last two bits indicate the identifier for use in the verification of the connected antenna route. The identifier for use in the choice of antenna route may be formed e.g. by treating some established standard data with an individual signal shaping method.

In addition to that which has been described above, the fifth embodiment of the invention may also be combined with the transmission of a broadcast signal provided with an individual emission from all transmission antenna branches as described earlier in connection with the preferred embodiment of the invention. Hereby the choice of transmission antenna route in the mobile station takes place based both on the traffic channel signal and the broadcast signal.

The arrangement according to the fifth embodiment of the invention described above includes instead of the broadcasting means identifying means for transmitting an individual emission on the traffic channel through each transmission antenna route, so that the emission will identify the transmission antenna route. In other respects the arrangement of the fifth embodiment of the invention is similar to the arrangement of the other embodiments described above.

It is an advantage of the fifth embodiment of the invention that the emission, which identifies the transmission antenna route and which is to be transmitted through all transmission antenna routes, can be transmitted on the traffic channel controlled by power control. Hereby the comparison of traffic channel signals for the choice of antenna becomes more reliable, when the variation in received power of these signals is less than without power control, and, in addition, the interference caused elsewhere in the network remains small. The mobile station may in a state-of-the-art manner transmit power control commands to the base station in order to control the transmission power of the traffic channel. The need for power control is determined in a state-of-the-art manner from the previous slot transmitted from the base station. Power control is connection specific. Relative power difference information on the identifier part of different traffic channel transmissions is sufficient for a comparison of traffic channel signals in accordance with the invention. The traffic channel identifiers can also be transmitted with the same power through different transmission antenna routes.

The fifth embodiment of the invention is especially advantageous in the case of a few receiving units, e.g. a mobile station MS. The identifier for use in the choice of transmission antenna route on the traffic channel may be transmitted e.g. only to receivers applying the method according to the invention as a point-to-point transmission. For the transmission of user data, an optimum transmission antenna route is connected individually for each receiving unit.

Although in the above fifth embodiment of the invention the application of the invention was presented in connection with a traffic channel, the invention can be used with the aid of any connection specific point-to-point channel. Thus, the traffic channel described above as an example means any connection specific channel.

The present invention may be applied together with any mobile communications system. The most advantageous application of the invention is the CDMA system, because multi-path channel estimates are constantly available directly in a CDMA receiver, and they need not be counted separately. The invention is especially advantageous in connection with a frequency division duplex transmission FDD.

The drawings and the related explanation are only intended to illustrate the inventive idea. As regards details, the transmission antenna diversity according to the invention may vary within the scope of the claims. Although the invention was described above mainly in connection with the choice of a downlink direction transmission antenna route transmitting from a base station to a mobile station, the invention may also be used for choosing an uplink direction transmission antenna route where the transmission is in the other direction, that is, from terminal equipment to base station, if the terminal equipment uses at least two transmission antennas and/or transmission antenna beams located at a sufficient distance from each other. The transmission antenna diversity according to the invention is suitable for implementation with transmission antenna routes of different kinds, such as transmission antenna branches and/or transmission antenna beams, even though the invention was described above mainly in connection with transmission antenna branches.

The invention claimed is:

1. Method for implementing transmission antenna diversity in a mobile communications system, which includes at least one receiving unit and at least one transmitting unit, adapted for data transmission connection over a radio path, said method comprising:
   transmitting a signal through at least one of at least two transmission antenna routes of the transmitting unit, the signal containing signal information which identifies the transmission antenna routes in the transmitting unit;
   choosing, in the receiving unit, an optimum transmission antenna route based at least on signals received from the transmitting unit that contain information identifying the transmission antenna route:
   making the chosen transmission antenna route known to the transmitting unit with an antenna route choice notification; and
   transmitting user data from the transmitting unit through a transmission antenna route selected for use in the transmitting unit, wherein the selection is based on the antenna route choice notification; and
   verifying, in the receiving unit, the transmission antenna route selected for use wherein the verification is based on information in the user data, and identifying the transmission antenna route selected for use.

2. A method according to claim 1, wherein the signal containing information which identifies the transmission antenna route, is a broadcast signal.

3. A method according to claim 2, wherein the broadcast signals of the transmission antenna routes includes at least one information part which is identical.

4. A method according to claim 3, wherein the information parts of the broadcast signals of the transmission antenna routes are identical.

5. A method according to claim 2, wherein information to be broadcast is divided between the transmission antenna routes.

6. A method according to claim 1, wherein the system comprises at least two transmitting units that are simultaneously in data transmission connection with the receiving unit over a radio path, wherein an optimum transmission antenna route combination which includes one transmission antenna of each of the at least two transmission units, is selected.

7. A method according to claim 1, wherein the system comprises at least two transmission units, and the optimum transmission antenna route is selected based at least in part on broadcast signals received from the at least two transmission units of the system.

8. A method according to claim 1, wherein the signal containing information which identifies the transmission antenna route, is a signal transmitted on a connection specific channel.

9. A method according to claim 8, further comprising transmitting broadcast signals through the transmission antenna routes of the transmitting unit wherein the optimum transmission antenna route is selected based on the signals of the connection specific channel and the broadcast signals of the transmission antenna routes.

10. A method according to claim 1, wherein the information identifying the transmission antenna route, is an antenna-route-specific identifier transmitted together with the transmitted signal.

11. A method according to claim 10, wherein the information identifying the transmission antenna route selected for use, is an identifier transmitted among the user data.

12. A method according to claim 11, wherein the identifier identifying the transmission antenna route selected for use is added to the user data in each of at least one transmission time slot.

13. A method according to claim 11, wherein the identifier identifying the transmission antenna route selected for use is added to the user data at least once during the transmission on the transmission antenna route selected for use.

14. A method according to claim 11, further comprising checking, in the receiving unit, the transmission antenna route selected for use based on the identifier transmitted with the user data.

15. A method according to claim 14, further comprising:
   generating statistics on how a measure of success of the transmission antenna route selected for use compares to the chosen optimum transmission antenna route, and
   notifying the transmission unit, when the measure of success falls short of a pre-established threshold value.

16. A method according to claim 15, wherein the transmitting unit is controlled to choose a pre-established transmission antenna route with the antenna route choice notification.

17. A method according to claim 14, further comprising changing transmission settings of a next antenna route choice notification, if the transmission antenna route selected for use differs from the chosen optimum transmission antenna route.

18. A method according to claim 17, further comprising sending a signal including the next antenna choice notification, with a higher transmission power.

19. A method according to claim 17, further comprising coding the next antenna choice notification with better channel coding.

20. A method according to claim 14, wherein the checking is performed by comparing the identifier of the transmission antenna route selected for use with the identifier of the chosen optimum transmission antenna route.

21. A method according to claim 1, wherein the information identifying the transmission antenna route is produced with an antenna-route-specific signal shaping method.

22. A method according to claim 21, wherein the antenna-route-specific signal shaping method is any one of an individual frequency offset, an individual symbol pattern, an individual hash code for spreading signal, an individual number of hash codes in parallel, or an individual channel coding method.

23. A method according to claim 21, wherein the antenna-route-specific signal shaping method is orthogonal.

24. A method according to claim 21, wherein the information identifying the transmission antenna route selected for use is an individual emission added to the user data.

25. A method according to claim 21, further comprising checking in the receiving unit, the transmission antenna route selected for use based on an individual emission added to the user data.

26. A method according to claim 25, wherein the checking is performed by comparing the individual emission of the transmission antenna route selected for use with the antenna-route-specific signal shaping method of the chosen optimum transmission antenna route.

27. A method according to claim 25, further comprising:
generating statistics on a measure of success of the transmission antenna route selected for use compares to the chosen optimum transmission antenna route, and
notifying the transmission unit, when the measure of success falls short of a pre-established threshold value.

28. A method according to claim 27, wherein the transmitting unit is configured to choose a pre-established transmission antenna route with the antenna route choice notification.

29. A method according to claim 25, further comprising changing transmission settings of a next antenna route choice notification, if the transmission antenna route selected for use differs from the chosen optimum transmission antenna route.

30. A method according to claim 29, further comprising sending a signal including the next antenna choice notification, with a higher transmission power.

31. A method according to claim 29, further comprising coding the next antenna choice notification with better channel coding.

32. A method according to claim 1, further comprising the step of channel coding the antenna route choice notification.

33. A method according to claim 1, wherein the antenna route choice notification is implemented by symbol puncturing.

34. A method according to claim 1, further comprising:
decoding the received user data,
wherein decoding the received user data is performed with a channel estimate of the chosen optimum transmission antenna route if the transmission antenna route for use is the same as the chosen optimum transmission antenna route, or decoding the received user data is performed with a channel estimate of the transmission antenna route selected for use if the transmission antenna route selected for use is different from the chosen optimum transmission antenna route.

35. A method according to claim 1, wherein the transmission antenna routes are transmission antenna branches.

36. A method according to claim 1, wherein the transmission antenna routes are transmission antenna beams.

37. A method according to claim 1, wherein the system comprises at least two receiver units and the transmission antenna route selected for use is selected individually for each receiver unit based on the antenna route choice notifications.

38. Arrangement for implementing transmission antenna diversity in a mobile communications system, wherein the system includes a receiving unit and a transmitting unit, the transmitting unit includes at least two transmission antenna routes, and the receiving unit and the transmitting unit are adapted for a data transmission connection with one another over a radio path, wherein
the transmitting unit further comprises:
transmitting means for transmission of a signal, said transmitting means being arranged to produce in the signals to be transmitted information identifying the transmission antenna route;
means for receiving an antenna route choice notification;
means for selecting for transmission of user data a transmission antenna route based on the received antenna route choice notification;
means for using a selected antenna route for the transmission of user data, and
means for forming, in the user data signal to be transmitted, information identifying the transmission antenna route selected for use; and
the receiving unit further comprises:
choosing means for choosing an optimum transmission route based on received signals having information identifying the transmission antenna route;
means for notifying the transmission unit of the chosen optimum transmission antenna route; and
verification means for verifying the transmission antenna route selected for use based on the information identifying the transmission antenna route selected for use contained in the user data signal formed in the transmission unit.

39. A mobile communications system comprising at least one transmitting unit and at least one receiving unit,
wherein at least one of said at least one transmitting unit comprises:
transmitting means for transmission of a signal, said transmitting means being arranged to produce in the signals to be transmitted information identifying the transmission antenna route;
means for receiving an antenna route choice notification;
means for selecting for transmission of user data a transmission antenna route based on the received antenna route choice notification;
means for using a selected antenna route for the transmission of user data; and
means for forming in the user data signal to be transmitted, information identifying the transmission antenna route selected for use; and
wherein at least one of said at least one receiving unit comprises:
choosing means for choosing an optimum transmission route based on received signals having information identifying the transmission antenna route;
means for notifying at least one transmitting unit of the chosen optimum transmission antenna route; and
verification means for verifying the transmission antenna route selected for use based on the information identifying the transmission antenna route selected for use, contained in the user data signal formed in a transmitting unit.

* * * * *